US009256025B2

(12) United States Patent
Roy et al.

(10) Patent No.: US 9,256,025 B2
(45) Date of Patent: Feb. 9, 2016

(54) TRIPLE-SHEATHED MONOMODE OPTICAL FIBER

(75) Inventors: Philippe Roy, Limoges (FR); Kay Schuster, Jena (DE); Stephan Grimm, Jena (DE)

(73) Assignees: Centre National de la Recherche Scientifique, Paris (FR); Universite de Limoges, Limoges (FR)

( * ) Notice: Subject to any disclaimer, the term of this patent is extended or adjusted under 35 U.S.C. 154(b) by 131 days.

(21) Appl. No.: 14/113,663

(22) PCT Filed: Apr. 24, 2012

(86) PCT No.: PCT/FR2012/050897
§ 371 (c)(1),
(2), (4) Date: Feb. 13, 2014

(87) PCT Pub. No.: WO2012/146866
PCT Pub. Date: Nov. 1, 2012

(65) Prior Publication Data
US 2014/0193127 A1    Jul. 10, 2014

(30) Foreign Application Priority Data

Apr. 26, 2011   (FR) ...................................... 11 53550

(51) Int. Cl.
*G02B 6/02*         (2006.01)
*G02B 6/036*        (2006.01)
*H01S 3/067*        (2006.01)

(52) U.S. Cl.
CPC .............. *G02B 6/02* (2013.01); *G02B 6/02314* (2013.01); *G02B 6/02361* (2013.01); *G02B 6/03638* (2013.01); *G02B 6/02333* (2013.01); *G02B 6/02338* (2013.01); *G02B 6/02352* (2013.01); *G02B 6/02357* (2013.01); *H01S 3/06733* (2013.01); *H01S 3/06741* (2013.01)

(58) Field of Classification Search
CPC .................................................. G02B 6/02314
See application file for complete search history.

(56) References Cited

U.S. PATENT DOCUMENTS

2009/0052476 A1   2/2009  Yao
2009/0201953 A1*  8/2009  Peyghambarian et al. ....... 372/6

* cited by examiner

*Primary Examiner* — Uyen Chau N Le
*Assistant Examiner* — Chad Smith
(74) *Attorney, Agent, or Firm* — Osha Liang LLP (57) ABSTRACT

According to the invention, the intermediate sheath (13) is formed by assembling longitudinal elements (13A) and includes: a first optical material, the refractive index of which differs from the refractive index of the monomode core by at most $10^{-3}$; and a second optical material, the refractive index of which is lower than the refractive index of said monomode core and differs therefrom by at least $10^{-3}$.

8 Claims, 4 Drawing Sheets

TRIPLE-SHEATHED MONOMODE OPTICAL FIBER

CROSS-REFERENCE TO RELATED APPLICATIONS

This application is a §371 national stage entry of International Application No. PCT/FR2012/050897, filed Apr. 24, 2012, which claims priority to French Patent Application No. 1153550 filed Apr. 26, 2011, the entire contents of which are incorporated herein by reference.

The present invention relates to an active optical fibre designed for monomode light emission.

Although not exclusively, this type of optical fibre can be used in applications for which it is important to transport or amplify high refractive powers while minimising the impact of non-linear effects.

Double-sheathed monomode optical fibres are already known. These fibres are made up of a glass core (of aluminosilicate, for example) doped with a rare earth (ytterbium, for example), used for the monomode amplification of an initial light beam. This core is directly surrounded by a multimode pumping sheath (silica, for example) with a larger dimension than the core, and this allows the propagation of the different modes of a multimode pump. An outer sheath, made of glass, polymer or air cells, of which the refractive index is much lower than those of the core and the multimode pumping sheath, surrounds said multimode pumping sheath.

This type of double-sheathed monomode optical fibre allows the production of high-powered laser beams with a large surface area. It also results in a higher pumping power (and therefore monomode amplification) compared with conventional monomode pumping.

To improve the amplification effectiveness of a monomode optical fibre of the above-mentioned type, it is important to improve the rate of absorption, by the monomode core, of the light from the multimode pumping sheath, this also depending on the doping rate and the diameter of the core. However, an improvement of this type must be performed while retaining the monomode character of the fibre (which also depends on the difference in the refractive index between the monomode core and the multimode pumping sheath), the quantal effectiveness of the material (which depends on the co-doping agents and the host matrix) and the guiding properties of said fibre.

However, if the doping rate (of ytterbium, for example) is increased in the monomode core with a view to improving the amplification effectiveness of the fibre, the result is an increase in the refractive index of the core (higher or lower depending on the possible co-doping agents), and thus an increase in the difference in refractive index between said core and the multimode pumping sheath. Therefore, to compensate for the effect of this increase and thus preserve the monomode character of the core, its diameter must be reduced, which de facto reduces the amplification effectiveness of the fibre. This means that the amplification effectiveness of the fibre cannot be improved by a suitable selection of the doping rate or core diameter.

A first solution for improving amplification effectiveness consists in reducing the effect of the doping of the monomode core on its refractive index. Accordingly, ytterbium can be associated with another doping agent, such as fluorine or boron, which has the effect, for the same doping rate, of reducing the refractive index of the core doped in this way compared with a core doped with ytterbium, and therefore makes it possible to increase the doping rate of the core without having to increase significantly the difference in refractive index between the core and the multimode pumping sheath.

However, as co-doping agents, fluorine and boron do not compensate completely for the increase in the refractive index produced by very high doping, such as with ytterbium. A degradation of the light-material interaction in the core results, which requires an increase in the length of the light-material interaction, but this produces, on the one hand, the appearance of non-linear effects and, on the other hand, a loss of compactness of the light source (in particular for fibres with a large core dimension which cannot be bent because of a very low difference in refractive index between the core and the sheath). Moreover, for very high ytterbium dopings, it is more difficult to obtain a uniform refractive index profile over the entire core, which may compromise achieving good quality control of the laser beam emitted.

A second solution for improving this amplification effectiveness consists in using triple-sheathed monomode optical fibres, as disclosed in document U.S. Pat. No. 6,841,053, to increase the refractive index of the sheath which directly surrounds the monomode core. To do this, an intermediate sheath is inserted between the core and the multimode pumping sheath, so that the fibre is therefore made up, from centre to periphery, of:

a monomode core doped with a rare earth (of aluminosilicate doped with ytterbium, for example);

an optically inactive (non-amplifying) intermediate sheath (of silica doped with germanium, for example), of which the refractive index differs slightly from that of said monomode core ($10^{-3}$ or less, for example);

a multimode pumping sheath (of silica, for example); and an outer sheath (of which the refractive index is much lower than those of the core, the intermediate sheath and the multimode pumping sheath).

This triple-sheathed optical fibre architecture allows the ytterbium-doping rate to be increased (and therefore the absorption rate by the core) without having recourse to fluorine and boron and while maintaining a suitable difference in refractive index between the monomode core and the sheath directly surrounding said core. In fact, the refractive index of the intermediate sheath (of silica doped with germanium, for example) can be adjusted by a suitable selection of the germanium doping rate, so that the difference between the refractive index of the core and that of the intermediate sheath is kept as low as possible, while also increasing the doping rate (and therefore the refractive index) of the monomode core.

However, in the above-mentioned type of monomode optical fibre, the refractive index profile is a critical parameter that can have a detrimental influence on its monomode amplification properties. However, in document U.S. Pat. No. 6,841,053, the core and the intermediate sheath each form a uniform layer produced using the MCVD (modified chemical vapour deposition) technique. The result is that, if the core is heavily doped to improve the amplification properties of the fibre, the refractive index profile in the uniform layer forming the intermediate sheath cannot be completely controlled, which here again, to preserve the monomode character of the fibre, requires the diameter of the core to be limited (to 20 μm, for example) and hence the amplification rate of the fibre too.

Another solution could consist in using a rod-type fibre, for which the monomode character depends in particular on the dimensions of the air holes of which it is formed (since air holes with too large a diameter necessarily produce multimode amplification). However, here again, since controlling the size of the air holes is difficult, controlling the refractive index of the intermediate sheath (and thus the monomode character of the fibre) is also difficult. Furthermore, in this type of fibre, the refractive index of the core must be exactly equal to that of pure silica and perfectly homogeneous. A mixture of materials, for example aluminosilicate doped with ytterbium and silica doped with fluorine, is therefore used and produced by multiple-step assembly-drawing until submicronic structuring perceived as homogeneous by the guided light ray is obtained. This complex technique therefore, on the one hand, leads to high costs and, on the other hand, does not allow the amplification effectiveness of the fibre to be optimised, since a significant part of the core is not doped with ytterbium and does not contribute to optical amplification.

Another solution may consist in using a "leakage channels" fibre, for which the monomode character is obtained in a similar way by very weak guiding between a core similar to that with rod-type fibres and a sheath with large low refractive index silica inclusions.

Another solution may consist in using a chirally coupled core fibre, for which the monomode character is obtained by removing the higher order modes of the multimode central core by selective coupling in a peripheral core rolled round the central core. Core homogeneity is obtained by multiple drawings-assemblies, but may not require silica that has not been doped with ytterbium. However, the core diameter is limited to less than 40 μm by technical difficulties, due to the selective removal of a very large number of higher order modes.

The object of the present invention is therefore to promote high monomode amplification (even with a large-diameter core and a high doping rate), while carefully controlling the refractive index profile in the intermediate sheath.

Therefore, according to the invention, the monomode optical fibre comprising, from centre to periphery:
a monomode core doped at least partly with a rare earth,
an optically inactive intermediate sheath,
a multimode pumping sheath, and
an outer sheath
is remarkable in that said intermediate sheath
is formed by assembling longitudinal elements, and
comprises a first optical material with a refractive index that differs from the refractive index of said monomode core by at most $10^{-3}$, and a second optical material with a refractive index that differs from the refractive index of said monomode core by at least $10^{-3}$.

Therefore, owing to the present invention, the intermediate sheath comprises a set of longitudinal elements, such as rods or bars, and comprises a portion (first optical material) with a refractive index that is close to that of the core and a portion (second optical material) with a refractive index that is different from that of the core.

The intermediate sheath is therefore perceived by the light as a generally heterogeneous material with an effective refractive index that is close to that of the core, this ensuring that the difference in refractive index between said core and said intermediate sheath can be kept at a low value, as such an index profile can be obtained precisely by a suitable selection of the refractive indices, proportions and arrangement for said portions of said intermediate sheath with different refractive indices, even if the refractive index of the core (because of its doping rate) is high. The fundamental propagation light mode can thus be confined in the core, which can therefore have a monomode character. The result is that, by reasonable control of two different optical materials on the macroscopic scale, the refractive index profile in the intermediate sheath thus formed can be suitably controlled on the microscopic scale.

In this way, a core can be produced with a large diameter and high doping rate while ensuring that the intermediate sheath has a suitable refractive index profile to limit the difference between the refractive index of said core and that of said sheath. The fibre thus formed therefore offers both enhanced monomode amplification and satisfactory guiding properties.

Furthermore, again owing to the present invention, the intermediate sheath is formed of longitudinal elements (rods, bars) which have the advantage that they are modular and can therefore be designed and assembled simply, which further facilitates the production of the fibre and also reduces its production costs.

Another advantage of the invention is that the (at least partial) doping of the core of the fibre can be carried out with a rare earth (such as ytterbium), while ensuring that a satisfactory refractive index profile is obtained in the core, even if that refractive index is high.

It will also be noted that, since the invention allows a higher doping rate in the core, this makes it possible, for the same monomode amplification rate and the same core diameter, to produce an optical fibre of shorter length, which helps limit the impact of non-linear effects on the light that is propagated in the fibre thus formed, and helps improve the compactness of the light sources used.

The refractive index profile in the intermediate sheath can be controlled particularly precisely if said intermediate sheath consists only of said longitudinal elements.

To assemble the longitudinal elements easily in the intermediate sheath, at least some of them can be arranged in said intermediate sheath in a matrix arrangement.

For the longitudinal elements of the intermediate sheath to be arranged side by side without loss of space, at least some of these longitudinal elements advantageously have a transverse hexagonal cross-section so that they can form a honeycomb matrix arrangement. However, other cross-sections can be used such as circular or square shapes, for example.

In the optical fibre according to the present invention, although the refractive index of the first optical material is equal or as close as possible to the refractive index of the monomode core, the effective refractive index of said intermediate sheath may also be slightly lower or slightly higher than the refractive index of the monomode core because the refractive index of the second optical material is either much lower or much higher than the refractive index of said monomode core.

The second optical material may, as an example, be aluminosilicate or silica doped with lanthanum, whereas the first optical material may also be aluminosilicate or silica with little or very low doping. Of course, these examples are not limiting, and said first and second optical materials can be made of any other compatible material with a suitable refractive index.

In the monomode optical fibre according to the present invention, said first and second optical materials may be distributed in a plurality of different modes.

In a first mode, said monomode optical fibre comprises longitudinal elements comprising:
a central longitudinal portion consisting of said first optical material, and
a peripheral longitudinal portion which surrounds said central longitudinal portion, has a transverse cross-sectional area that is smaller than the transverse cross-sectional area thereof and consists of said second optical material.

In a second mode, said monomode optical fibre comprises first longitudinal elements consisting of said first optical material and second longitudinal elements consisting of said second optical material.

In a variant, the monomode optical fibre according to the present invention may comprise first longitudinal elements consisting of said first optical material and second longitudinal elements comprising:

a central longitudinal portion consisting of said first optical material, and a peripheral longitudinal portion which surrounds said central longitudinal portion, has a transverse cross-sectional area that is smaller than the transverse cross-sectional area thereof and consists of said second optical material.

The transverse dimension of the longitudinal elements of the intermediate sheath may be greater than the monomode emission wavelength of the monomode optical fibre by a factor of at least 10, for example. In this case, the intermediate sheath is perceived by the light as being a generally heterogeneous material and the light is confined to the interior of the core by modified total internal reflection (MTIR).

In a variant, the transverse dimension of the longitudinal elements of the intermediate sheath may be less than the monomode emission wavelength of the monomode optical fibre. In this case, the light perceives the intermediate sheath as a generally homogeneous material with an effective refractive index that is close to that of the core and the light is propagated inside the fibre by total internal reflection (TIR).

Preferably, the monomode core can have a transversally homogeneous refractive index on the scale of the monomode emission wavelength. In this case, to achieve better confinement and preferential amplification of the fundamental propagation mode, the centre of the core is doped with a rare earth, whereas the periphery thereof is not doped.

To enhance the modularity of the optical fibre, the core and/or multimode pumping sheath may comprise longitudinal elements.

Modal discrimination at the core can be improved by arranging modal filtering means on the core and/or on the intermediate sheath. These filtering means, which are complementary in terms of selection by preferential amplification of the desired mode, may be in the form of losses targeted on the higher order propagation modes and can be formed by, for example, inscribing tilted gratings in the core and/or the intermediate sheath.

To confine only the fundamental mode in the core, the effective refractive index of the intermediate sheath may differ from the refractive index of the monomode core by $10^{-4}$ at most for cores with dimensions that may approach $100\lambda$ (some $10^{-4}$ for smaller cores).

To produce a monomode optical fibre according to one of the embodiments described above, a production process can be used in which, to produce the intermediate sheath:

a set of powders is arranged in preforms corresponding to longitudinal elements of said intermediate sheath, said preforms are vitrified, the dimensions of said longitudinal elements are adjusted by drawing out fibres to form said longitudinal elements, said longitudinal elements are arranged to form said intermediate sheath, and a vacuum is established between said longitudinal elements (which allows a structure to be obtained that is completely solid, that is with no air).

This process, based on the vitrification of powders principle, allows particularly effective control of the refractive index of the materials forming the intermediate sheath, and this makes it possible to produce partly doped structures with a complex refractive index profile, while allowing a monomode light beam to be emitted despite a core that may be large and have a high refractive index. The volumes produced (which represent 15 to 100 times the volume synthesised using the MCVD method) allow the production process to be simplified, in that this process allows a preform to be obtained that can be used directly, replacing a plurality of MCVD preforms that had to be rectified mechanically or chemically to obtain the longitudinal elements to be assembled.

In addition, a vacuum having been established, this fibre production process provides a completely solid optical fibre with few or no air holes, and this facilitates the connection of said fibre to fibred components and also the assembly of reliable sources.

Another advantage of this process is that it produces a small quantity of unusable fibres, which has the effect of significantly reducing the cost of producing a monomode optical fibre according to the invention, compared with other processes well known to the person skilled in the art for producing a triple-sheathed monomode optical fibre.

Preferably, to produce the monomode core:

a powder is arranged in preforms corresponding respectively to longitudinal elements of the monomode core, said preforms are vitrified, the dimensions of said preforms are adjusted by drawing out fibres to form said longitudinal elements, said longitudinal elements are arranged to form said monomode core, and a vacuum is established between said longitudinal elements.

The preform allowing the optical fibre according to the present invention to be produced preferably consists of a judicious arrangement of longitudinal elements to form the core and the intermediate sheath. A vacuum can therefore be established preferably during a preform drawing step, and this allows the fibre according to the present invention to be obtained.

The figures of the accompanying drawings will explain how the invention can be produced. In these figures, identical references denote technically similar elements.

Diagrams A, B, C and D of FIG. 5 show successive steps in the process for producing longitudinal elements of the monomode optical fibres of FIGS. 2A and 4.

Figure 1A:
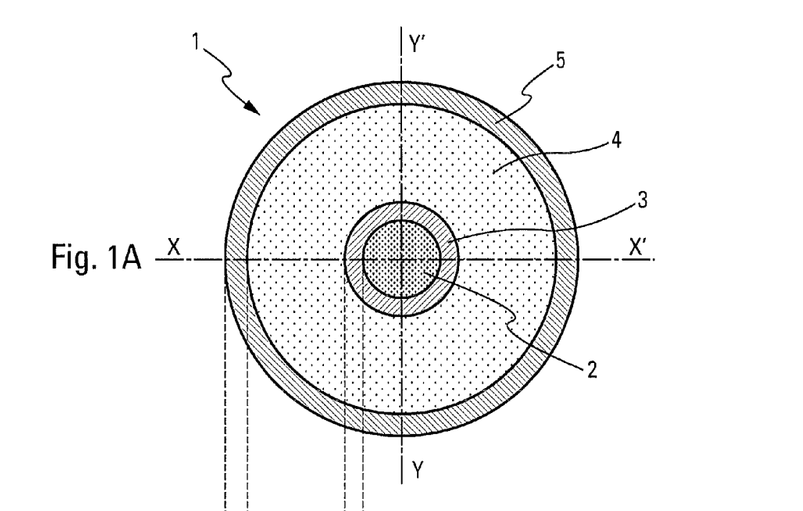
FIG. 1A is a diagrammatic view in cross-section of a triple-sheathed monomode optical fibre according to the prior art.

A triple-sheathed monomode optical fibre 1 according to the prior art, which is provided to emit a light ray having a wavelength of, for example, between 1030 and 1100 nm (the typical wavelength for the ytterbium ion, but which can be transposed to 1.5 µm or 2 µm or any other wavelength) and of which the transverse cross-section in a plane (X-X'; Y-Y') is shown in FIG. 1A, comprises, from centre to periphery:

a monomode core 2 that is at least partly doped with a rare earth;

an intermediate sheath 3 which is optically inactive but helps give the core its monomode character;

a multimode pumping sheath 4; and an outer sheath 5.

The core 2 has a refractive index $n_2$ (FIG. 1B) and a dimension limited to about 25-30 µm. It may be made of silica or aluminosilicate and doped with a rare earth such as ytterbium (or erbium or alternatively thulium), or of any other material that has the advantage of making it easier to obtain a uniform refractive index profile. It may however be inactive in a particular zone to allow the preferential amplification of a single mode (for example the fundamental mode). The diameter of the core is usually limited to 25-30 µm by the precision of the refractive indices of the different materials that allow the conventional production techniques (MCVD for example) to be ensured.

The intermediate sheath 3 surrounds the core 2. This sheath 3, with a refractive index $n_3$ (FIG. 1B), which is lower than the refractive index $n_2$ of the core 2, may be made of silica (or aluminosilicate) doped with germanium, for example.

Figure 1B:
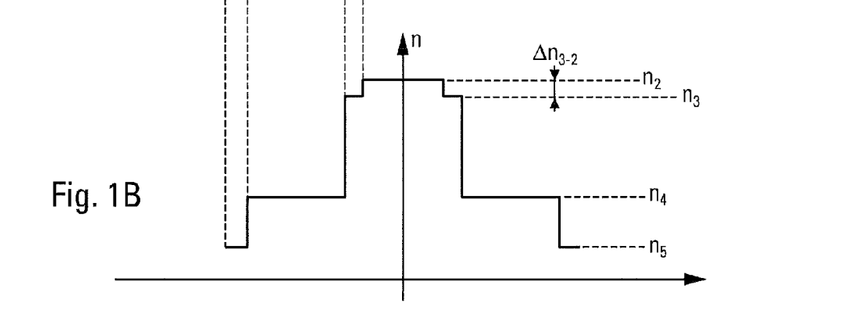
FIG. 1B is a diagram illustrating the transverse distribution of the refractive index in the optical fibre of FIG. 1A.

The refractive index $n_3$ of the sheath 3 must be determined so that the difference $\Delta n_{3-2}$ between the refractive index $n_2$ of the core 2 and that $n_3$ of said sheath 3 is as low as possible, for example $10^{-3}$, this being a limit generally accepted by the person skilled in the art. This allows monomode propagation of the light in the core 2 to be obtained according to a set of total internal reflections (a technique known as TIR).

The multimode pumping sheath 4 surrounds the intermediate sheath 3 (FIG. 1A). This sheath 4 has a refractive index $n_4$ which is lower than or equal to the refractive indices $n_2$ (of the core 2) and $n_3$ (of the sheath 3) and is of a suitable dimension compared with those of said core 2 and said intermediate sheath 3 to allow the propagation of the different modes of a multimode pump. For this purpose and to simplify production, it may be made of silica that has not been doped (by a rare earth) or of aluminosilicate that has not been doped (by a rare earth). The form of the multimode pumping sheath 4 is not necessarily circular, in order to improve the absorption of the pumping power, in accordance with techniques that are well known to the person skilled in the art.

The outer sheath 5 surrounds the multimode pumping sheath 4. This sheath 5, with a refractive index $n_5$ (FIG. 1B) which is lower than (and preferably much lower than) the refractive indices $n_2$, $n_3$ and $n_4$, allows both the interior of the fibre 1 to be protected and the pumping ray to be guided. It may consist of air cells or alternatively be made of a material suited to high temperatures (polymer, fluoridated coating, etc.). It will be noted that the refractive index $n_5$ of this sheath 5 must be low, and sufficiently different from the refractive indices of the core 2 and the sheaths 3 and 4.

It will be noted that the core 2 is not necessarily situated in the centre of the optical fibre 1, nor surrounded concentrically by the intermediate sheath. Similarly, the shape of the core and the various sheaths is not necessarily circular.

To enhance the monomode amplification of the triple-sheathed optical fibre of FIGS. 1A and 1B while improving its optical guiding properties, the invention relates to a particular intermediate sheath architecture, a first example of which is illustrated in FIGS. 2A, 2B, 3A and 3B.

Figure 2A:
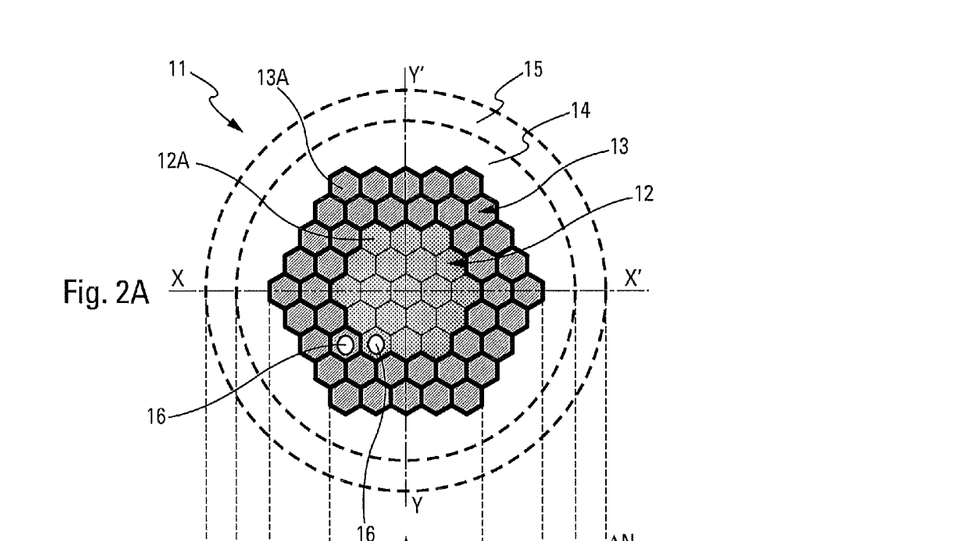
FIG. 2A is a diagrammatic view in cross-section of a first example of a triple-sheathed monomode optical fibre according to the present invention.

The triple-sheathed monomode optical fibre 11 according to the present invention, which is provided for example to emit a light ray with a wavelength of 1030 nm, the transverse cross-section of which in a plane (X-X'; Y-Y') is shown in FIG. 2A, comprises, from centre to periphery:

a monomode core 12 which is similar to the core 2 and has a refractive index $N_{12}$;

an intermediate sheath 13 (like the intermediate sheath 3) which is optically inactive and has an effective refractive index $N_{13}$;

a multimode pumping sheath 14 which is similar to the pumping sheath 4 and has a refractive index $N_{14}$; and an outer sheath 15 which is similar to the sheath 5 and has a refractive index $N_{15}$.

The intermediate sheath 13 shown in FIG. 2A comprises a plurality of longitudinal elements 13A, such as rods or bars, arranged to form a plurality of coaxial layers (two in FIG. 2A) surrounding the core 12.

These longitudinal elements 13A, which are preferably (but not necessarily) all identical, are arranged adjacently to cover the entire longitudinal and transverse extension of the fibre 11. They each have a hexagonal cross-section, the sides of which are in contact with those of the adjacent longitudinal elements. However, any other cross-sectional shape can be adopted, in particular a circular, rectangular or triangular shape, provided this does not produce air holes of too large a transverse extension between adjacent longitudinal elements.

Figures 2B, 3A:
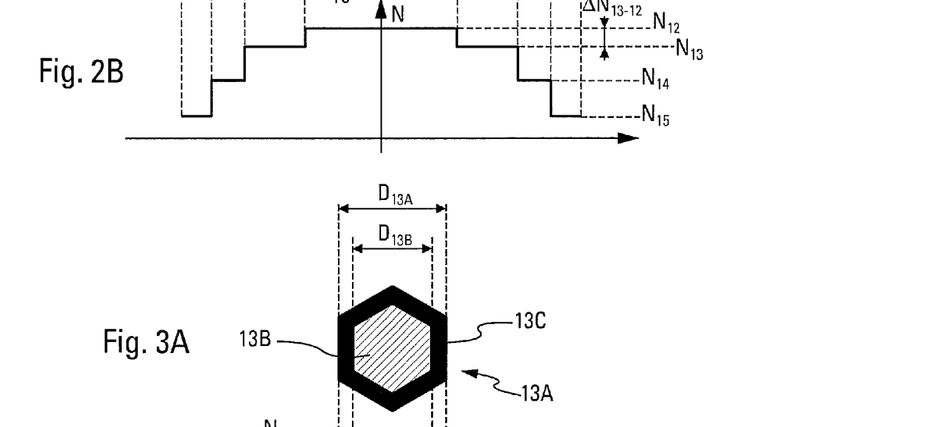
FIG. 2B is a diagram illustrating the transverse distribution of the refractive index in the optical fibre of FIG. 2A.
FIG. 3A is a diagrammatic view in cross-section of one of the longitudinal elements, the assembly of which forms the partly doped structure of the intermediate sheath of the optical fibre of FIG. 2A.

As shown in more detail in FIG. 3A, a longitudinal element 13A of the intermediate sheath 13 comprises two coaxially adjacent portions, that is a first (central) longitudinal portion 13B surrounded by a second (peripheral) longitudinal portion 13C. In the longitudinal elements 13A of the intermediate sheath 13, the peripheral longitudinal portion 13C consists of an optical material with a refractive index that differs from the refractive index of the monomode core 12 by at least $10^{-3}$, and the central longitudinal portion 13B consists of an optical material with a refractive index that differs from that of said monomode core by $10^{-3}$ at most. For example, in the longitudinal element 13A of FIG. 3A, the first longitudinal portion 13B is made of an optical material such as, for example, silica doped with lanthanum or aluminosilicate doped with lanthanum and has a refractive index $N_{13B}$ which is higher than that $N_{13C}$ of the second longitudinal portion 13C made of an optical material such as, for example, silica or aluminosilicate that are not doped or only slightly doped (in terms of refractive index). In this way, the refractive index $N_{13C}$ of the second longitudinal portion 13C, determined so as to be significantly different from that $N_{12}$ of the core 12 (lower than the refractive index of the core by at least $5 \cdot 10^{-3}$, for example) ensures that the light is guided in said core 12.

Moreover, the transverse cross-sectional area of the first longitudinal portion 13B is larger than that of the second longitudinal portion 13C, and this allows an effective refractive index $N_{13}$ of the intermediate sheath 13 to be obtained which is substantially close to (and preferably lower than in the case of TIR or MTIR guiding) that $N_{12}$ of the core 12.

The monomode optical fibre 11 thus formed of an intermediate sheath 13 is therefore suitable for guiding a light ray of a predetermined monomode emission wavelength and for effectively amplifying that ray. The person skilled in the art knows this guiding method by the name "modified total internal reflection" (MTIR).

Although the structure is completely solid in this case, the guiding principle is similar to that used in microstructured fibres with air holes known as photonic crystal fibre (PCF) or alternatively in rod-type fibres.

It will be noted that a possible variant consists in having a material 13C with a refractive index $N_{13C}$ which is much higher than all the other refractive indices of the structure (higher for example than the refractive index of the core 12 by at least $10^{-2}$). The optical fibre 1 therefore retains the advantages mentioned above, but the light is guided in said fibre by a prohibited photonic band (PPB), this also providing better resistance to bending losses.

It will also be noted that it is possible to select the transverse dimension of the second longitudinal portion 13C so that it is less than the monomode emission wavelength. In this case, the light is propagated in the fibre by total internal reflection (TIR) since the structured material is perceived as homogeneous by the light ray with a higher wavelength than the pattern size.

The arrangement of a central longitudinal portion 13B and a peripheral longitudinal portion 13C in a longitudinal element 13A provides heterogeneous transverse distribution (along a transverse cross-section of the sheath 13) of the refractive index. However, any other type of arrangement could be used, in particular an arrangement with more than two portions with different refractive indices, In this regard, it is only important that the transverse distribution of the refractive index in the sheath 13 is such that, on the one hand, the difference $\Delta N_{13\text{-}12}$ between the refractive index $N_{12}$ of the core 12 and the effective refractive index $N_{13}$ of the sheath 13 is at least equal to $10^{-3}$ (preferably $10^{-4}$), and, on the other hand, the longitudinal portions (here the portions 13B) of the longitudinal elements 13A for which the refractive index is lowest (here the refractive index $N_{13C}$) have suitable dimensions to allow confinement by TIR or MTIR in the optical fibre 11.

Figure 3B:
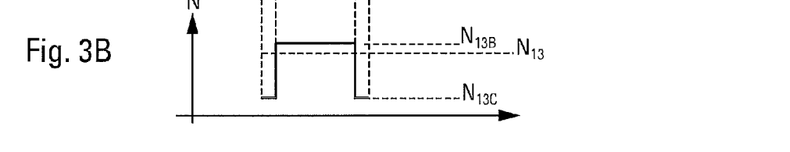
FIG. 3B is a diagram illustrating the transverse distribution of the refractive index in the longitudinal element shown in FIG. 3A.

For the intermediate sheath 13 to have the features mentioned above, the person skilled in the art will know how to make the appropriate adjustments to, inter alia, the following parameters:

the number of rings formed of longitudinal elements 13A;

the doping rates of the longitudinal portions 13B and 13C of each longitudinal element 13A, which determine their respective refractive indices;

the ratio of the cross-sectional areas of said portions 13B and 13C of each longitudinal element 13A (or alternatively the ratio of the dimensions $D_{13B}$ and $D_{13A}$, with reference to FIG. 3B), which determines the effective refractive index of the sheath 13; and the dimension of the longitudinal elements.

Since the intermediate sheath 13 is therefore formed of longitudinal elements 13A suitable for being assembled together, said sheath 13 is modular and can be formed from a carefully chosen set of longitudinal elements—which are not necessarily all identical. In particular, depending on the applications envisaged, it could be appropriate to assemble in the same sheath 13 longitudinal elements having cross-sections of different shapes and having constituent portions with different dimensions and/or made of different materials and/or doped at different rates, provided that these portions have suitable refractive indices. However, to achieve better homogeneity by symmetry of revolution about the sheath 13, it may be preferred to provide for concentric layers of the sheath 13 to be formed from longitudinal elements that are all identical. Moreover, an arrangement of non-identical elements or a non-symmetrical arrangement may allow, for example, a fibre that maintains its polarisation or a polarising fibre to be produced.

It will be noted that, for the same reasons of modularity of the fibre, the core 12 shown in FIG. 2A (made, for example, of aluminosilicate doped with ytterbium) is also made of longitudinal elements 12A, the transverse cross-section of which has the same shape and the same dimension as the transverse cross-section of the longitudinal elements 13A forming the intermediate sheath 13. These longitudinal elements 12A may each be made of a single optical material, consisting for example of silica or aluminosilicate doped with ytterbium.

It will also be noted, still in the interests of greater modularity, that the multimode pumping sheath 14—or even the outer sheath 15—may also be made of a set of longitudinal elements with a cross-section of the same shape and the same dimension as that of the longitudinal elements 13A.

Moreover, still with reference to FIG. 2A, to improve modal discrimination and thus enhance the propagation of the fundamental mode only in the core 12, losses 16 can be arranged respectively at some longitudinal elements 12A and 13A of the core 12 and of the intermediate sheath 13. These losses 16, targeted on the higher order propagation modes, allow said modes to be filtered. To arrange them, recourse can be had to, for example, a tilted grating inscription technique, which is well known to the person skilled in the art.

In this regard, the person skilled in the art will know how to determine the optimum positions and dimensions of these losses to filter suitably the higher order modes for a particular configuration of the core 12 and intermediate sheath 13.

In FIGS. 2A and 3A, only a transverse cross-section of the optical fibre 11 is shown, but clearly this cross-section could be the same over the entire longitudinal extension of said fibre 11.

Similarly, although the description above relates to an intermediate sheath 13 consisting entirely of longitudinal elements 13A, clearly said intermediate sheath 13 may be only partly formed of these elements, and the rest of the sheath may be formed of a single longitudinal element with a unique refractive index.

Figure 4:
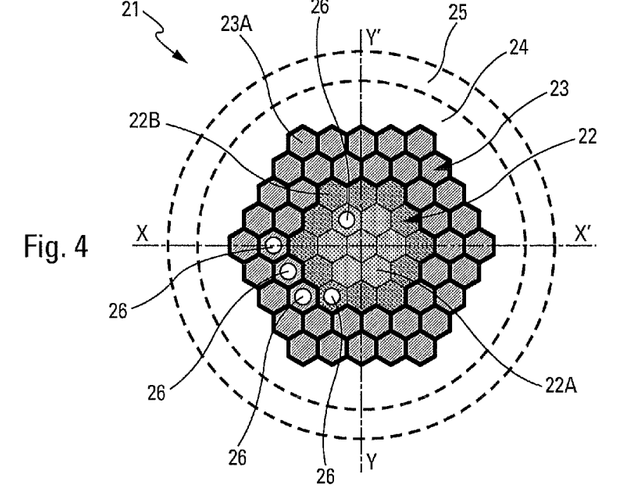
FIG. 4 is a diagrammatic view in cross-section of a variant of the triple-sheathed monomode optical fibre of FIG. 2A.

FIG. 4 shows a variant embodiment 21 of the triple-sheathed monomode optical fibre described above. This optical fibre 21 is similar to the optical fibre 11 of FIG. 2A, in particular the intermediate sheath 23, the multimode pumping sheath 24 and the outer sheath 25 correspond to the sheaths 13, 14 and 15 respectively of the optical fibre 11. Similarly, the longitudinal elements 23A correspond to the elements 13A.

The core 22 of this optical fibre 21 differs from the core 12 in that it is partly doped and comprises, for example at its centre, a set of doped longitudinal elements 22A (made, for example, of aluminosilicate doped with ytterbium), similar to the longitudinal elements 12A of the optical fibre 11, and at its periphery, longitudinal elements 22B with a cross-section of the same shape and the same dimension as that of the longitudinal elements 22A (and also of the longitudinal elements 23A), and also the same refractive index as that of the longitudinal elements 22A, these elements 22B not being actively doped (made, for example, of aluminosilicate doped with lanthanum or germanium, but not containing ytterbium or another optically active rare earth).

In this case, as with the first embodiment of FIG. 2A, losses 26 (similar to the losses 16) may be introduced at some of the longitudinal elements 22A, 22B and 23A.

Figure 5:
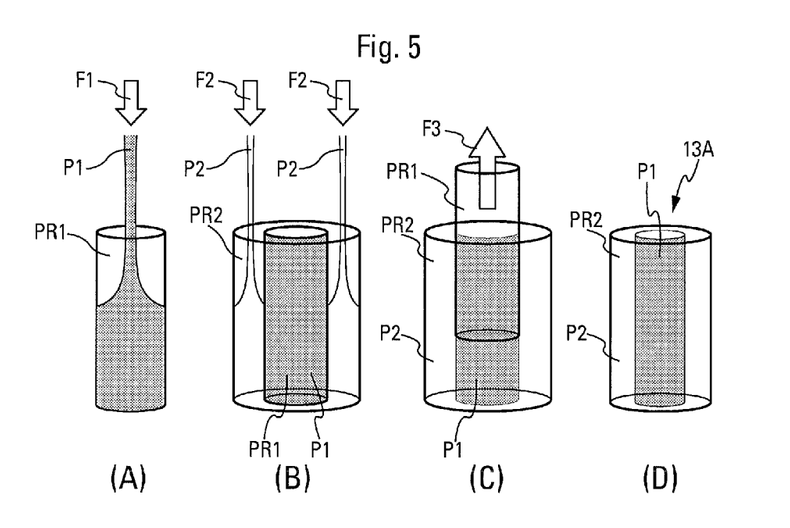

To produce a monomode optical fibre 11 (or 21) according to the present invention, a production process illustrated in diagrams A to D of FIG. 5 may be used. According to this process, each longitudinal element 13A (as well as 12A and 12B) may be formed by vitrification of powders, in accordance with the following steps:

a first powder P1 (intended to form the central longitudinal portion 13B) is arranged inside a first tube (acting as a preform) PR1 (diagram A of FIG. 5);

this first preform PR1 is inserted into a second tube (acting as a preform) PR2 of a larger dimension, then a second powder P2 (intended to form the peripheral longitudinal portion 13C) is arranged inside this second tube PR2, in the space left free by said first tube PR1 (diagram B of FIG. 5);

once the two powders P1 and P2 have been arranged inside the second tube PR2, the first tube PR1 is removed (diagram C of FIG. 5);

finally, the powders P1 and P2 are vitrified inside the second tube P2 to form the central 13B and peripheral 13C longitudinal portions respectively of the longitudinal element 13A (diagram D of FIG. 5), it then being possible if necessary to remove the second tube 32 by mechanical or chemical abrasion.

Diagrams A to D of FIG. 5 illustrate an example of the production of a cylindrical longitudinal element, but clearly this process can be adapted to a longitudinal element with a hexagonal or otherwise shaped cross-section.

Alternatively, each longitudinal element 13A (as well as 12A and 12B) can be produced by vitrification of powder and, if appropriate, external deposition of material in accordance with the following steps:

a first powder (intended to form the central longitudinal portion 13B or 12A) is arranged inside a first preform tube;

this preform is vitrified;

the preform can then be abraded to adjust the thickness of the portion 13C or completely removed to obtain a homogeneous material over the entire cross-section as when forming an element 12A for example;

if all the peripheral material is removed but a peripheral portion 13C is useful, external deposition by OVD or POVD for example can be performed to form a portion 13C with the required refractive index.

Next, the longitudinal elements 13A vitrified in this way are arranged to form the intermediate sheath 13, then a vacuum is established between these elements 13A to assemble them and thus form said intermediate sheath 3.

This process can be applied to form the longitudinal elements 12A, 22A and 22B of the core 12 or 22, and also, if necessary, the longitudinal elements intended to form the multimode pumping sheath 14—or even the outer sheath 15. In this case, if the element in question is formed from a single portion with a unique refractive index, only one preform and one powder need be used. The same applies to the longitudinal elements 22A, 22B and 23A of the optical fibre 21 shown in FIG. 4.

This vitrification process, applied to the longitudinal elements of the monomode optical fibre 11 (or 21) according to the invention, in particular allows:

effective control of the refractive index of the materials forming the core and the intermediate sheath 13 (or 23) (and thus maximisation of the effective cross-sectional area and minimisation of the impact of non-linear effects);

effective control of the levels of doping (hence the gain and length of useful fibre) to minimise the impact of non-linear effects;

synthesis of much larger volumes than by the CVD methods and consequently considerable simplification of the fibre production process and therefore a reduction in the cost thereof;

the provision of a completely solid optical fibre, which facilitates connection of the fibre to fibred components, as well as the assembly of reliable sources; and the production of a small quantity of unusable fibres, which significantly reduces the cost of producing a monomode optical fibre.

Other production processes could be used to produce and assemble the longitudinal elements together. As an example, a peripheral longitudinal portion 13C (or 23C) could be arranged round a central longitudinal portion 13B (or 23B) by external deposition (outside vapour phase oxidation (OVPO) or plasma enhanced outside vapour deposition (POVD, etc.) or by sliding the peripheral longitudinal portion 13C (or 23C) into a fine tube containing the central longitudinal portion 13B (or 23B). Next, the longitudinal elements can be subjected to a series of assembly-drawing steps, the interstitial holes between the longitudinal elements being then reclosed due to surface tension and, if need be, to a slight reduction in pressure. In this regard, a honeycomb structure, with longitudinal elements of hexagonal cross-section, allows confinement of the fundamental mode by total internal reflection.

Figure 6A:
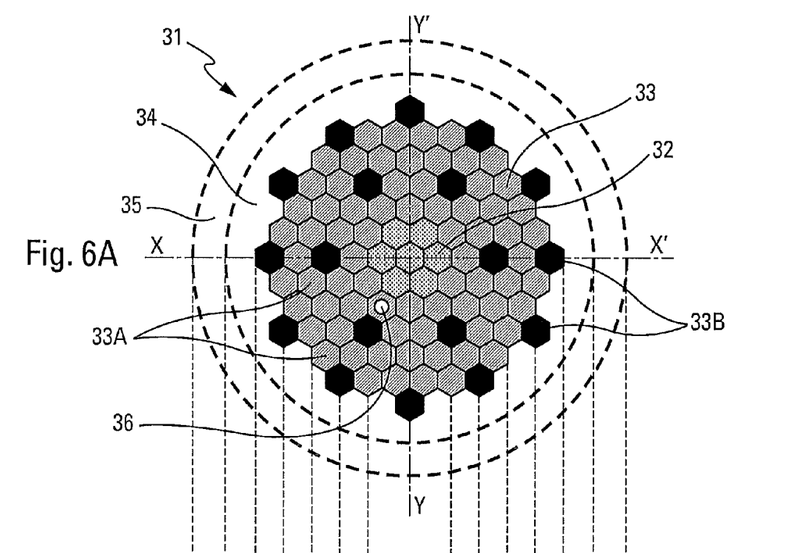
FIG. 6A is a diagrammatic view in cross-section of a second example of a triple-sheathed monomode optical fibre according to the present invention.
Figure 6B:
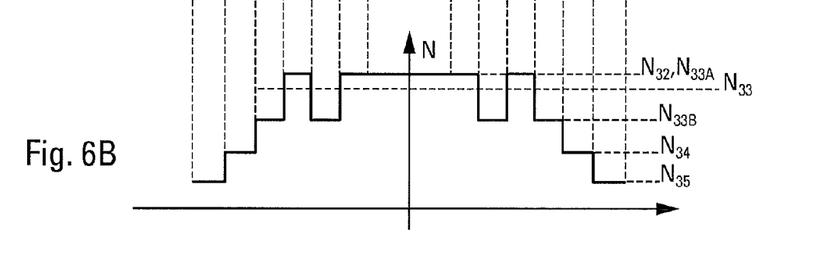
FIG. 6B is a diagram illustrating a diametral distribution, along the diameter X-X' of FIG. 6A, of the refractive index in the optical fibre of FIG. 6A.

Another embodiment of the monomode optical fibre according to the present invention is shown in FIGS. 6A and 6B.

The monomode optical fibre 31 according to the present invention and illustrated in FIGS. 6A and 6B comprises from centre to periphery:

a monomode core 32 which is similar to the core 12 of the fibre 11 and has a refractive index $N_{32}$;

an intermediate sheath 33 which consists of longitudinal elements 33A and 33B and is optically inactive, but which helps give the core its monomode character;

a multimode pumping sheath 34 which is similar to the pumping sheath 14 of the fibre 11 and has a refractive index $N_{34}$;

an outer sheath 35 which is similar to the outer sheath 15 of the fibre 11 and has a refractive index $N_{35}$.

Like the intermediate sheath 13 of the fibre 11, the intermediate sheath 33 comprises two optical materials, the first of which has a refractive index that differs from the refractive index of the monomode core 32 by $10^{-3}$ at most and the second of which has a refractive index that differs from the refractive index of said monomode core 32 by at least $10^{-3}$.

However, in the monomode fibre 31, these two optical materials, instead of being present together in the longitudinal elements of the intermediate sheath (as is the case for the longitudinal elements 13A of the intermediate sheath 13), form the homogeneous constituent material of the distinct longitudinal elements 33A and 33B respectively: the longitudinal elements 33A consist (just like the central portions 13B of the longitudinal elements 13A) of said first optical material, whereas the longitudinal elements 33B consist (just like the peripheral portions 13C of the longitudinal elements 13A) of said second optical material.

In the example of a refractive index distribution shown in FIG. 6B, the refractive index $N_{33A}$ of the first optical material is as close as possible to the refractive index $N_{32}$ of the monomode core 32. In this example, it is assumed that the refractive index $N_{33B}$ of the second optical material was lower than the refractive index $N_{32}$ of the monomode core 32. The result is an effective or average refractive index $N_{33}$ of the sheath 33 which is slightly lower than the refractive index $N_{32}$ of the monomode core 32. However, as was explained in relation to the monomode fibre 11, this refractive index $N_{33B}$ of the second optical material could be higher than said refractive index $N_{32}$ of the monomode core.

It will be noted that the monomode optical fibre 31 of FIG. 6A may comprise losses 36 and have a structure that is particularly simple to produce, for example using the process described above. The cost of production is therefore particularly low.

Although not shown in the drawings, it will be readily understood that the monomode optical fibre according to the present invention may have first longitudinal elements, identical to the elements 33A, consisting of said first optical material and second longitudinal elements, identical to the elements 13A and comprising:

a central longitudinal portion 13B consisting of said first optical material, and a peripheral longitudinal portion 13C which surrounds said central longitudinal portion 13B, has a transverse cross-sectional area which is smaller than the transverse cross-sectional area thereof and is made of said second optical material.

Whatever the mode of production, the monomode optical fibre according to the present invention has the same optical properties, and also numerous advantages, such as a completely solid structure, high doping of the core and excellent management of the higher order modes.

The monomode optical fibre according to the present invention can be used advantageously, although not exclusively, in applications such as:

micrometric or nanometric machining;

laser source generation, for example in the infrared range;

generation of frequency combs, mono-frequency sources, etc.;

light detection and ranging (LIDAR) devices for measuring winds or vortexes, etc., pumping for other sources, for example "soft glass" fibre-based, optical parametric oscillators (OPO);

medicine (laser bistoury, ophthalmology, etc.);

pollutant detection;

producing laser weapons;

inter-satellite communication; or any other application that may require the transport or amplification of a monomode light ray.

The invention claimed is:

1. Monomode optical fiber comprising, from center to periphery:
   a monomode core doped at least partly with a rare earth,
   an optically inactive intermediate sheath,
   a multimode pumping sheath, and
   an outer sheath,
   wherein the intermediate sheath is formed by an assembly of solid bars, and
   said assembly of solid bars comprises first solid bars made of a first optical material with a refractive index that differs from the refractive index of said monomode core by at most $10^{-3}$, and second solid bars made of a second optical material with a refractive index that differs from the refractive index of said monomode core by at least $10^{-3}$.

2. Monomode optical fiber according to claim 1, wherein
   the refractive index of said first optical material is equal or as close as possible to the refractive index of said monomode core, and
   intermediate sheath has an effective refractive index lower than the refractive index of the monomode core, the refractive index of said second optical material being much lower than the refractive index of said monomode core.

3. Monomode optical fiber according to claim 1, wherein
   the refractive index of said first optical material is equal or as close as possible to the refractive index of said monomode core, and
   the intermediate sheath has an effective refractive index higher than the refractive index of the monomode core, the refractive index of said second optical material being much higher than the refractive index of said monomode core.

4. Monomode optical fiber according to claim 1, wherein, in said assembly, said solid bars of the intermediate sheath are arranged in a matrix arrangement.

5. Monomode optical fiber according to claim 1, wherein the solid bars of the intermediate sheath have a transverse dimension greater than the monomode emission wavelength of said monomode optical fiber by a factor of at least 10.

6. Monomode optical fiber according to claim 1, wherein the solid bars of the intermediate sheath have a transverse dimension less than the monomode emission wavelength of said monomode optical fiber.

7. Monomode optical fiber according to claim 1, wherein modal filtering means are arranged at the monomode core and/or the intermediate sheath.

8. Monomode optical fiber according to claim 1, wherein the intermediate sheath has an effective refractive index that differs from the refractive index of the monomode core by $10^{-4}$ at most.

* * * * *